United States Patent
Vogel et al.

(10) Patent No.: US 9,567,480 B2
(45) Date of Patent: Feb. 14, 2017

(54) AMBIENT CURE WEATHERABLE COATINGS

(71) Applicant: Blue Cube IP LLC, Midland, MI (US)

(72) Inventors: Erin B. Vogel, Midland, MI (US); Ray E. Drumright, Midland, MI (US); Susan Machelski, Midland, MI (US); Rebecca L. Ladewski, Midland, MI (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 14/423,503

(22) PCT Filed: Oct. 23, 2013

(86) PCT No.: PCT/US2013/066287
§ 371 (c)(1),
(2) Date: Feb. 24, 2015

(87) PCT Pub. No.: WO2014/066457
PCT Pub. Date: May 1, 2014

(65) Prior Publication Data
US 2015/0240111 A1    Aug. 27, 2015

Related U.S. Application Data

(60) Provisional application No. 61/717,659, filed on Oct. 24, 2012.

(51) Int. Cl.
| | | |
|---|---|---|
| *C09D 163/00* | (2006.01) | |
| *C08G 59/24* | (2006.01) | |
| *C08G 59/50* | (2006.01) | |
| *C08G 59/14* | (2006.01) | |
| *C08L 63/00* | (2006.01) | |

(52) U.S. Cl.
CPC .......... *C09D 163/00* (2013.01); *C08G 59/1477* (2013.01); *C08G 59/24* (2013.01); *C08G 59/5006* (2013.01); *C08G 59/5026* (2013.01); *C08G 59/5073* (2013.01); *C08L 63/00* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 3,496,130 | A | 2/1970 | Wasem et al. |
| 3,629,181 | A | 12/1971 | Heer et al. |
| 3,639,344 | A | 2/1972 | Kinnneman, Jr. et al. |
| 4,113,684 | A | 9/1978 | Petrie |
| 4,310,695 | A | 1/1982 | Dante |

(Continued)

FOREIGN PATENT DOCUMENTS

WO    WO 2009/142898 A1    11/2009

*Primary Examiner* — Robert S Loewe
(74) *Attorney, Agent, or Firm* — Polsinelli PC (57) ABSTRACT

An adduct including a reaction product of (a) at least a first cycloaliphatic amine compound; (b) at least a second cycloaliphatic amine compound; and (c) at least one cycloaliphatic epoxy resin compound; a curable epoxy resin coating composition including (i) the above adduct; and (ii) at least one thermosetting epoxy resin compound; said curable composition being curable at ambient temperature; and a cured weatherable coating prepared from the above curable composition.

24 Claims, 2 Drawing Sheets

(56) References Cited

U.S. PATENT DOCUMENTS

| | | | | |
|---|---|---|---|---|
| 4,798,761 | A * | 1/1989 | Wykowski | C08G 59/38 |
| | | | | 442/89 |
| 5,246,984 | A | 9/1993 | Darwen et al. | |
| 5,310,770 | A | 5/1994 | DeGooyer et al. | |
| 5,539,023 | A * | 7/1996 | Dreischhoff | C04B 24/281 |
| | | | | 523/404 |
| 6,187,374 | B1 * | 2/2001 | Hardy | C03C 17/32 |
| | | | | 156/94 |
| 6,258,919 | B1 * | 7/2001 | Vogel | C08G 59/184 |
| | | | | 523/428 |
| 6,566,423 | B2 * | 5/2003 | Schrotz | C08G 59/184 |
| | | | | 428/413 |
| 2003/0149194 | A1 * | 8/2003 | Chow | C08G 18/581 |
| | | | | 525/528 |
| 2010/0210758 | A1 * | 8/2010 | Muller-Frischinger | A61B 8/06 |
| | | | | 523/456 |
| 2011/0297317 | A1 * | 12/2011 | Lutz | C09J 163/00 |
| | | | | 156/330 |
| 2011/0315916 | A1 * | 12/2011 | Wilson | C08G 59/027 |
| | | | | 252/74 |

\* cited by examiner

AMBIENT CURE WEATHERABLE COATINGS

FIELD

The present invention is related to curable epoxy resin compositions useful in coating applications such as for preparing weatherable coatings useful in maintenance and protective coating applications. The present invention curable epoxy resin compositions are advantageously cured at ambient temperature conditions.

BACKGROUND

Epoxy resins are one of the most important classes of thermosetting polymers with greater than (>) about 50 percent (%) being used for protective coatings such as weatherable coating used in maintenance and protective coating (M&PC) applications. Known epoxy resins useful in coating applications include for example bisphenol A diglycidyl ether (BADGE) which are popular in the industry (e.g., >75% of resin sales volume) because BADGE is readily available in the industry and because BADGE exhibits a good balance of properties.

However, BADGE based articles exhibit poor ultraviolet (UV) light resistance; and the poor UV light resistance property of BADGE based articles creates difficulties with yellowing and chalking in exterior applications. The poor ultraviolet (UV) light resistance of BADGE based articles is due to aromatic ether groups present in the chemical structure of BADGE because the aromatic ether groups present in the chemical structure of BADGE tend to absorb UV radiation leading to photooxidative degradation. For this reason, epoxy resin coatings made from BADGE are often overcoated with a durable top coat made from for example polyurethane, an alkyd, or an acrylic composition in order to impart protection to the epoxy under coating.

Approximately 80% of the cost of a protective coating system comes from labor to prepare the surface and apply the coating. If an epoxy coating could be made with weatherable properties and useful in applications such as anticorrosion coating systems without the requirement for a top coat, such epoxy coating could provide significant systems savings in terms of costs of materials and labor efficiencies.

Some non-aromatic epoxy resin compounds are inherently UV resistant because the epoxy resin compounds lack aromatic ether linkages. For example, 1,4-cyclohexanedimethanol (CHDM) epoxy resin and Unoxol™ (an epoxy resin which is a mixture of 1,3 and 1,4 cis and trans cyclohexanedimethanol epoxy resin), are both aliphatic epoxy resins; and such resins lack aromatic ether linkages, but instead contain aliphatic linkages. Thus, such aliphatic epoxy resin compounds are inherently more UV resistant than aromatic epoxy resins.

However, aliphatic epoxides do not react effectively with conventional nucleophilic epoxy curing agents, such as amines, at ambient temperature (e.g. at about 25° C.). The lower reactivity at ambient temperature arises because (i) the aliphatic epoxides are less susceptible to nucleophilic attack due to the lower electronegativity of the cycloaliphatic ring relative to the aromatic ring in standard epoxies, and (ii) conventional amine curing agents lack compatibility with cycloaliphatic epoxy resins.

Furthermore, curing agents used with cycloaliphatic epoxy resins often require additional accelerators, such as DMP-30 or salicylic acid to achieve ambient cure. The accelerators often negatively affect coating performance by introducing aromatic groups, particularly aromatic groups with a heteroatom directly bound to the aromatic ring, into the coating formulation. Such curing agents pose a barrier which has historically prevented cycloaliphatic epoxy resins from use in ambient temperature cure M&PC applications.

For example, U.S. Pat. No. 5,310,770 discloses water-reducible curing agents for epoxy resins made from the diglycidyl ether of cyclohexane dimethanol and a diamine selected from the group consisting of meta-xylylene diamine, isophorone diamine, diaminocyclohexane and 1,3-bisaminomethyl cyclohexane. These curing agents are soluble in water and are useful for curing epoxy resin compositions. U.S. Pat. No. 5,310,770 discloses an aqueous solution of a hardener made at an epoxy to amine stoichiometric ratio of 1:2. U.S. Pat. No. 5,310,770 does not disclose coating formulations nor cured coating compositions. In addition, U.S. Pat. No. 5,310,770 does not teach the use of amine adducts to improve the compatibility and the reactivity of such adducts with cycloaliphatic epoxies. Also, no curing accelerators nor stabilizers are mentioned in U.S. Pat. No. 5,310,770. Nothing in U.S. Pat. No. 5,310,770 teaches the use of adducts based on weatherable curing agents and cycloaliphatic epoxy for weatherable coating applications.

WO2009142898(A1) discloses adducts from UNOXOL epoxy resin. The homogeneity of adduct with epoxy resin not a requirement in WO2009142898(A1). In addition, ambient temperature cure is not demonstrated in WO2009142898(A1).

Other epoxy-amine adducts are known in the art including WO2009142898(A1); U.S. Pat. Nos. 4,310,695, 3,629,181, 5,246,984, 3,496,130, 3,639,344 and 4,113,684. None of the above reference teach adducts suitable for curing epoxy resins, wherein the adduct is prepared by reacting an epoxy resin with an amine and the adduct is used in weatherable coating applications.

In addition, epoxy resins prepared by reacting aliphatic and cycloaliphatic diols with Lewis acids typically results in an epoxy resin containing a significant amount of chlorine due to oligomerization of epichlorohydrin onto the alcohol functionality. This bound chlorine provides unwanted sites for reaction with amines during adduct preparation and results in the release of chlorides into a composition. These high chloride containing adducts have an undesirable high viscosity and low reactivity. For example U.S. Pat. No. 4,310,695 teaches removal of chlorine from an adduct by converting the adduct to hydroxyl functionality by hydrolysis in order to avoid problems when chlorine is present in the adduct. When high chloride containing adducts are subsequently cured with epoxy to yield coatings, these high chloride containing adducts provide low coating performance properties such as gloss, water resistance, and corrosion resistance.

SUMMARY

The above-mentioned problems of the prior art are addressed by the present invention. Curable epoxy resin compositions are prepared using adducted cycloaliphatic amine curing agents and cycloaliphatic epoxy resins that when cured show good weatherability. The epoxy-amine adducts display good compatibility and good reactivity with cycloaliphatic epoxy resins.

One embodiment of the present invention is directed to an adduct including a reaction product of (a) at least a first cycloaliphatic amine compound; (b) at least a second cycloaliphatic amine compound; and (c) at least one cycloaliphatic epoxy resin compound.

Another embodiment of the present invention is directed to an adduct including a blend of:

(I) at least a first adduct including: (a) at least a first cycloaliphatic amine compound; and (b) at least one cycloaliphatic epoxy resin compound; and (II) at least a second adduct including: (a) at least a second cycloaliphatic amine compound; and (b) at least one cycloaliphatic epoxy resin compound.

Still another embodiment of the present invention is directed to a curable epoxy resin composition comprising (i) any one or more of the above-described adducts, and (ii) at least one thermosetting epoxy resin compound; said curable composition being curable at ambient temperature.

Yet another embodiment is directed to a curable epoxy resin composition including (i) any one or more of the above-described adducts; (ii) at least one thermosetting epoxy resin compound; and (iii) at least one accelerator compound, (iv) at least one stabilizer compound or both (iii) and (iv); said curable composition being curable at ambient temperature.

Even still another embodiment of the present invention is directed to a cured epoxy thermoset weatherable coating prepared from the above curable composition useful for example in maintenance and protective coating (M&PC) applications.

Even yet other embodiments of the present invention are directed to processes for manufacturing the above-described adducts, the above-described curable composition, and the above-described weatherable coating.

The weatherable coatings formed from the curable coating formulations or compositions of the present invention advantageously show excellent UV resistance with balanced coating proprieties. For example a curable composition containing the adduct of CHDM epoxy resin with isophorone diamine (IPDA) and bis(2-(piperazin-1-yl)ethyl amine (BPEA) provides an excellent balance of coating proprieties.

BRIEF DESCRIPTION OF THE DRAWINGS

For the purpose of illustrating the present invention, the drawing shows a form of the present invention which is presently preferred. However, it should be understood that the present invention is not limited to the embodiments shown in the drawing.

DETAILED DESCRIPTION

A curable composition can be formulated when one of the components of a curable composition includes a thermosetting resin compound such as an epoxy resin compound and the other component of the curable composition is a curing agent (also referred to as a hardener or cross-linking agent) which is used to cure the thermosetting resin compound to form a thermoset resin matrix.

In the present invention the component used as the curing agent in a curable composition of the present invention is an adduct composition. Accordingly, one broad embodiment of the present invention is directed to providing an adduct composition for use as a curing agent; and another broad embodiment of the present invention is directed to providing a curable epoxy resin composition containing the adduct as a curing agent. In still another broad embodiment of the present invention is directed to a weatherable coating prepared from the curable epoxy resin composition containing the adduct as a curing agent.

As aforementioned, the adduct may include a reaction product of (a) at least a first cycloaliphatic amine compound; (b) at least a second cycloaliphatic amine compound; and (c) at least one cycloaliphatic epoxy resin compound. An alternative adduct may include a blend of: (I) at least a first adduct including: (a) at least a first cycloaliphatic amine compound; and (b) at least one cycloaliphatic epoxy resin compound; and (II) at least a second adduct including: (a) at least a second cycloaliphatic amine compound; and (b) at least one cycloaliphatic epoxy resin compound.

The first cycloaliphatic amine compound useful in preparing the adduct of the present invention may include any one or more cycloaliphatic amine compounds known in the art. For example, a first cycloaliphatic amine compound useful in preparing the adduct of the present invention may include bis(2-(piperazin-1-yl)ethyl amine (BPEA); high molecular weight BPEA oligomers; diamines such as 1,3-bisaminomethyl cyclohexane, isophorone diamine; bis(4-aminocyclohexyl)methane; 1,3-bisaminomethyl benzene; 1,2-diaminocyclohexane;, and mixtures thereof.

Preferred embodiments of the first cycloaliphatic amine compounds useful in the present invention may include any of the cycloaliphatic amine compounds described in U.S. Provisional Patent Application Ser. No. 61/581,323, titled FORMATION OF HIGH MOLECULAR WEIGHT CYCLIC POLYAMINE COMPOUNDS FROM CYCLIC POLYAMINE COMPOUNDS, filed Dec. 29, 2011 by Stephen W. King, incorporated herein by reference. Examples of the first cycloaliphatic amine compounds useful in the present invention include bis(2-(piperazin-1-yl)ethyl)amine (BPEA), (3-(piperazin-1-yl)propyl)amine, bis(4-(piperazin-1-yl)butyl)amine, bis(5-(piperazin-1-yl)pentyl)amine, bis(6-(piperazin-1-yl)hexyl)amine, bis(1-(piperazin-1-yl)propan-2-yl)amine, bis(2-(piperazin-1-yl)propyl)amine, and mixtures thereof.

High molecular weight cycloaliphatic amine compounds useful as the first cycloaliphatic amine compound in the present invention can include for example 2-(4-(2-(piperazin-1-yl)ethyl)piperazin-1-yl)ethanamine, 3-(4-(3-(piperazin-1-yl)propyl)piperazin-1-yl)propan-1-amine, 4-(4-(4-(piperazin-1-yl)butyl)piperazin-1-yl)butan-1-amine, 5-(4-(5-(piperazin-1-yl)pentyl)piperazin-1-yl)pentan-1-amine, 6-(4-(6-(piperazin-1-yl)hexyl)piperazin-1-yl)hexan-1-amine, 1-(4-(1-(piperazin-1-yl)propan-2-yl)piperazin-1-yl)propan-2-amine, 2-(4-(2-(piperazin-1-yl)propyl)piperazin-1-yl)propan-1-amine, and mixtures thereof.

Other cycloaliphatic diamines that may be used as the first cycloaliphatic amine compound in the present invention can include for example aminoethylpiperazine (AEP), bis(4-aminocyclohexyl)methane) (PACM), diaminocyclohexane (DACH), bis(aminomethyl)cyclohexane (BAC), isophorone diamine (IPDA), or mixtures thereof.

The second cycloaliphatic amine compound useful in preparing the adduct of the present invention may include any one or more cycloaliphatic amine compounds known in the art as described above with reference to the first cycloaliphatic amine compound so long as the first and second cycloaliphatic amine compounds are different from each other when used to prepare the adduct of the present invention.

For example, the second cycloaliphatic amine compound useful in preparing the adduct of the present invention may include any one or more of the following compounds: BPEA; BPEA oligomers; 1,3-bisaminomethyl cyclohexane; bis(4-aminocyclohexyl)methane; 1,3-bisaminomethyl benzene; 1,2-diaminocyclohexane; AEP; IPDA; or mixtures thereof.

The sum of the molar equivalents of active hydrogen (N—H) in the first and second cycloaliphatic amine compounds used in preparing the adduct of the present invention may range generally from about 2 to about 20 in one embodiment, from about 3 to about 18 in another embodiment, from about 5 to about 15 in still another embodiment, and from about 8 to about 12 in yet another embodiment, based on the moles of epoxy functionality used in preparing the adduct.

In a preferred embodiment, the stoichiometric ratio of epoxy functionality to amine functionality in the composition to make the adduct is at least 1:5 and preferably at least 1:7.

The adduct composition of the present invention includes at least one or more cycloaliphatic epoxy resin compounds to form the adduct. For example, the at least one cycloaliphatic epoxy resin compound can include a cyclohexanedimethanol epoxy resin such as 1,4-cyclohexanedimethanol epoxy resin, or a mixture of 1,3-cyclohexanedimethanol epoxy resin and 1,4-cyclohexanedimethanol epoxy resin; a hydrogenated bisphenol A epoxy resin; or mixtures thereof.

Preferred embodiments of the epoxy resin useful in the present invention include for example 1,4-cyclohexanedimethanol epoxy resin (CHDM epoxy resin), Unoxol™ epoxy resin, hydrogenated bisphenol epoxy resins, and mixtures thereof.

Epoxy resins prepared from reaction of aliphatic and cycloaliphatic diols using non-Lewis acid processes contain low bound chlorine; and as aforementioned above, problems encountered by the prior art epoxy systems can be averted. In addition, an added benefit of epoxy resins prepared from aliphatic and cycloaliphatic diols using non-Lewis acid processes is that these epoxy resins possess low levels of monoglycidyl ether and moderate to high levels of oligomeric product with an average epoxide functionality greater than 2. Due to the presence of low monoglycidyl ether and moderate to high levels of higher functional oligomers, coatings derived from these resins display superior crosslink density properties, and therefore, superior chemical resistance properties. Thus, the epoxy resins used to prepare the compositions of the present invention preferably have low chlorine, low monoglycidyl ether, and an oligomeric component with an average functionality greater than 2.

In general, the amount of oligomer content in the epoxy resin may be from about 5 wt % to about 25 wt % in one embodiment, from about 5 wt % to about 20 wt % in another embodiment, and from about 10 wt % to about 20 wt % in still another embodiment, based on the weight of the epoxy resin.

The amount of chlorine in the epoxy resins generally may be from 0 wt % to about 4 wt % in one embodiment, from about 0.001 wt % to about 2 wt % in another embodiment, and from about 0.001 wt % to about 1 wt % in still another embodiment, based on the weight of the epoxy resin.

Generally, the amount of monoglycidyl ether in the epoxy resin may be 0 wt % to about 10 wt % in one embodiment, from about 0.001 wt % to about 8 wt % in another embodiment, and from about 0.001 wt % to less than about 5 wt % in still another embodiment, based on the weight of the epoxy resin.

Other minor components may be present as a component of the epoxy resin used to prepare the compositions of the present invention. Generally, the minor components present in the epoxy resin composition may be present in an amount of from 0 wt % to about 5 wt % in one embodiment, from about 0.001 wt % to about 2 wt % in another embodiment, and from about 0.001 wt % to less than about 0.5 wt % in still another embodiment, based on the weight of the epoxy resin.

The epoxy resins prepared from hydroxyl compounds via non-Lewis acid processes display an epoxide equivalent weight (EEW) of generally no more than about 20% higher than the theoretical EEW of the chemically pure diglycidyl ether derived from the same hydroxyl compound in one embodiment, less than about 15% higher than the theoretical EEW of the chemically pure diglycidyl ether derived from the same hydroxyl compound in another embodiment, and less than about 10% higher than the theoretical EEW of the chemically pure diglycidyl ether derived from the same hydroxyl compound.

Cycloaliphatic epoxy resins prepared from hydrogenation of aromatic epoxy resins contain low bound chlorine therefore averting the aforementioned problems common to epoxy resins obtained by reacting aliphatic alcohols with epichlorohydrin with Lewis-acid processes. The cycloaliphatic epoxy resins prepared from hydrogenation of aromatic epoxy compounds display an EEW of no more than about 20% higher than the theoretical EEW in one embodiment, less than about 15% higher than the theoretical EEW in another embodiment, and less than about 10% higher than the theoretical EEW in one embodiment, of the chemically pure hydrogenated diglycidyl ether.

Generally, the molar equivalents of epoxy in the epoxy compound used in the preparation of the adduct composition of the present invention, may be for example, from about 0.05 to about 0.5 in one embodiment, from about 0.06 to about 0.4 in another embodiment; and from about 0.07 to about 0.2 in still another embodiment, and from about 0.08 to about 0.125 in yet another embodiment, based on the moles of amine functionality used in preparing the adduct. If the concentration of the epoxy compound falls outside of the aforementioned ranges, the resulting adduct will either be too viscous for practical application or the concentration adducted amine will be too small and compatibility will not be substantially enhanced.

The adduct composition of the present invention may include optional compounds or additives useful for their intended purpose. Optional compounds that may be added to the adduct composition of the present invention may include for example accelerators such as for example, benzyl alcohol, alkyl phenols, salicylic acid, and tris-2,4,6-dimethylaminomethyl phenol; fillers including for example finely divided minerals such as silica, alumina, zirconia, talc, sulfates, $TiO_2$, carbon black, graphite, silicates and the like; other curing agents; other epoxy resins; reinforcing agents; solvents; rheology modifiers; surfactants; UV stabilizers; antioxidants; wetting agents; colorants including pigments, dyes, and tints; and mixtures thereof.

Generally, the amount of optional compounds or additives used in the adduct composition of the present invention, may be for example, from 0 wt % to about 70 wt % in one embodiment, from about 0.01 wt % to about 60 wt % in another embodiment; and from about 5 wt % to about 50 wt % in still another embodiment, based on the total weight of the adduct composition. The amount of optional compounds used will depend on the specific compounds used in the composition. As one illustration, when an accelerator is used, the amount can be from about 0.1 wt % to about 10 wt % for an accelerator like tris-2,4,6-dimethylaminomethyl phenol; and in another illustration, when an accelerator like benzyl alcohol is used, the amount can be from about 5 wt % to about 70 wt %. These amounts can be determined by the skilled artisan.

The process for preparing the adduct composition of the present invention includes mixing, admixing or blending (a) at least first cycloaliphatic amine compound; (b) at least second cycloaliphatic amine compound; and (c) at least one cycloaliphatic epoxy resin compound; and any other optional ingredients as needed. For example, the preparation of the adduct formulation of the present invention is achieved by blending in known mixing equipment IPDA, BPEA, CHDM epoxy resin, and optionally any other desirable additives; and then allowing the above compounds to react under process conditions to form an adduct reaction product. Any of the above-mentioned compounds may be added to the adduct composition in any mixing order.

All the compounds of the adduct formulation are typically mixed and dispersed at a temperature enabling the preparation of an effective adduct composition for a particular application such as for a coating composition. For example, the temperature during the mixing of all components may be generally from about 10° C. to about 200° C. in one embodiment, and from about 20° C. to about 150° C. in another embodiment.

In another embodiment, the process for preparing the adduct composition of the present invention can be carried out by first producing a first adduct including the reaction product of (a) at least first cycloaliphatic amine compound; and (b) at least one cycloaliphatic epoxy resin compound; and then second producing a second adduct including the reaction product of (a) at least second cycloaliphatic amine compound; and (b) at least one cycloaliphatic epoxy resin compound. Then the first and second adducts described above can be blended together to form a combination adduct composition of at least two adducts to act as the curing agent for a curable composition containing at least one thermosetting epoxy resin compound. Any other optional ingredients can be added to the adduct composition as needed.

For example, the preparation of the adduct formulation of the present invention is achieved by blending the first and second adducts in known mixing equipment, and optionally any desirable additives. Any of the above-mentioned compounds may be added to the adduct composition in any mixing order.

The preparation of the adduct formulation of the present invention, and/or any of the steps thereof, may be a batch or a continuous process. The mixing equipment used in the process may be any vessel and ancillary equipment well known to those skilled in the art.

Compatibility of the adduct composition with the epoxy resin used to prepare a curable composition which eventually is cured to form a thermoset product is important for obtaining good cure and desired final properties of the coating product formed from the cured product. Compatibility is assessed by initial gloss of the cured clear (non-pigmented) film; and is preferably above 80 for 60° gloss.

The viscosity of the adduct composition of the present invention may range generally from about 0.1 Pa-s to about 200 Pa-s in one embodiment, from about 0.2 Pa-s to about 100 Pa-s in another embodiment, and from about 0.5 Pa-s to about 50 Pa-s in still another embodiment. The use of the adduct composition will be limited if the viscosity of the adduct composition is higher than the above ranges of viscosities.

As aforementioned, in order to formulate a curable composition, one of the components of a curable composition includes a thermosetting resin such as a cycloaliphatic epoxy resin compound and the other component of the curable composition is a curing agent such as a cycloaliphatic amine compound; the curing agent is used to cure the thermosetting resin.

The component used as the curing agent in the curable composition of the present invention can be any of the adduct compositions described above. Accordingly, another broad embodiment of the present invention includes a curable epoxy resin formulation or composition including (i) one or more of the above-described adduct compositions, and (ii) at least one thermosetting epoxy resin compound.

In addition to the components (i) and (ii) of the curable composition, the curable epoxy resin composition can include (iii) at least one accelerator compound; or (iv) a stabilizer compound; or a mixture of (iii) at least one accelerator compound and (iv) a stabilizer compound. The curable composition is capable of being cured at ambient temperature and at a predetermined curing time.

The curing agent used in the curable composition of the present invention as component (i) comprises one or more of the adduct compositions as described above. For example, the adduct curing agent used in the curable composition can be a single reaction product of (a) at least first cycloaliphatic amine compound; (b) at least second cycloaliphatic amine compound; and (c) at least one cycloaliphatic epoxy resin compound as described above. Alternatively, the adduct curing agent used in the curable composition can be a blend or combination of a first and second adducts described above.

The amount of the adduct used to prepare the curable composition can be measured in terms of molecular equivalents. The molar equivalence of active hydrogen (N—H) in the adduct composition used in the curable composition of the present invention may range generally from about 0.5 to about 1.5 mole equivalents in one embodiment, from about 0.6 to about 1.3 mole equivalents in another embodiment, from about 0.7 to about 1.1 mole equivalents in still another embodiment based on the moles of epoxy of the curable composition. If the concentration of the adduct is outside the above listed ranges, the adduct will either be present in significant excess or depletion, which creates coatings that will not be fully cured and will have poor final coating properties.

The thermosetting epoxy compound useful as component (ii) in preparing a curable composition of the present invention may comprise, for example, any one or more of the epoxy compounds described above with reference to an adduct composition, i.e., the thermosetting epoxy compounds useful in the present invention may include for example at least one epoxy compound which can be the same or different from the cycloaliphatic epoxy resin compound used to form the adduct. For example, the thermosetting epoxy compound useful in the present invention may include a cyclohexanedimethanol epoxy resin such as 1,4-cyclohexanedimethanol epoxy resin, or a mixture of 1,3-cyclohexanedimethanol epoxy resin and 1,4-cyclohexanedimethanol epoxy resin; a hydrogenated bisphenol A epoxy resin; or mixtures thereof.

One embodiment of the thermosetting epoxy compound used in the curable composition of the present invention, may be for example a single epoxy compound; or a combination of two or more epoxy compounds known in the art such as any of the non-aromatic epoxy compounds described in Lee, II. and Neville, K., *Handbook of Epoxy Resins*, McGraw-Hill Book Company, New York, 1967, Chapter 2, pages 2-1 to 2-27, incorporated herein by reference. The thermosetting epoxy compound may include for example epoxy resins based on reaction products of polyfunctional cycloaliphatic alcohols, or cycloaliphatic carboxylic acids, with epichlorohydrin.

Preferred embodiments of the thermosetting epoxy resin useful in the present invention include for example 1,4-cyclohexanedimethanol epoxy resin (CHDM DGE), Unoxol™ epoxy resin, hydrogenated bisphenol epoxy resins, and mixtures thereof. The molar equivalence of epoxy in the thermosetting epoxy compound used in the curable composition of the present invention may range generally from about 0.7 to about 2 molar equivalents in one embodiment, from about 0.8 to about 1.5 molar equivalents in another embodiment, from about 0.9 to about 1.4 molar equivalents in still another embodiment based on the moles of active amine hydrogen (N—H) in adduct used in the curable composition. If the concentration of the thermosetting epoxy compound is outside the above listed ranges, the thermosetting epoxy compound will either be present in significant excess or depletion, which creates coatings that will not be fully cured and will have poor final coating properties.

In another embodiment of the present invention an accelerator can be added to the curable epoxy resin composition. For example, the accelerator may include salicylic acid; bisphenol A; t-butylphenol; alkylated phenol; calcium nitrate; benzyl alcohol; 2,4,6-tris(dimethylaminomethyl) phenol; and mixtures thereof.

When an accelerator is used in the composition of the present invention, the amount of accelerator can vary depending on the accelerator used, on the other components in the composition, and on the enduse of the curable composition. For example, as one illustration of the present invention, when an accelerator is used in the composition of the present invention, generally the amount of the accelerator can be from about 0.1 wt % to about 10 wt % for an accelerator such as tris-2,4,6-dimethylaminomethyl phenol. As another illustration of the present invention, for example, when an accelerator like benzyl alcohol is used in the composition of the present invention, generally the amount of the accelerator can be from about 5 wt % to about 70 wt %. The above amounts and other amounts for different accelerators can be determined by the skilled artisan.

In another embodiment of the present invention, a stabilizer compound can be added to the curable epoxy resin composition. Generally, the stabilizer may include for example a UV stabilizer or a thermal stabilizer or a mixture of these two stabilizers. These stabilizers may prevent or reduce the degradation of the coatings by UV radiation or thermal exposure. Any conventional UV stabilizer or thermal stabilizer known to a person of ordinary skill in the art may be added to the formulation disclosed herein. Non-limiting examples of suitable UV stabilizers include benzophenones, benzotriazoles, triazines, acrylesters, oxanilides, acrylic esters, formaidines, carbon black, hindered amines radical scavengers, nickel quenchers, phenolic antioxidants, metallic slats, zinc compounds, hydroquinone, p-methoxyphenol, pyrogallol, chloranil, cuprous chloride and combinations thereof.

In another embodiment of the present invention wherein a UV stabilizer is used, the curable epoxy resin composition of the present invention includes UV stabilizers such as for example UV absorber Tinuvin® 123 and radical scavenger Tinuvin® 400.

Generally, the amount of the stabilizer used in the curable composition of the present invention will depend on the enduse of the curable composition. For example, as one illustrative embodiment, when the curable composition is used to prepare a composite, the concentration of stabilizers can be generally from about 0 wt % to about 10 wt % of the curable composition in one embodiment, from about 1 wt % to about 6 wt % of the curable composition in another embodiment; from about 1 wt % to about 4 wt % of the curable composition in still another embodiment; and from about 1 wt % to about 2 wt % of the curable composition in yet another embodiment.

In addition to the adduct used as a curing agent in the curable composition of the present invention, optionally an additional curing agent different from the adducts described above can be used for the thermosetting epoxy compound. The optional curing agent can be any conventional curing agent known in the art useful for including in a curable composition. For example, the optional curing agent useful in combination with the adduct of the present invention for the curable composition, may be selected, for example, but are not limited to, anhydrides, carboxylic acids, amine compounds, phenolic compounds, thiols, or mixtures thereof.

Generally, the optional conventional curing agent known in the art can be blended with the adduct, component (i) or the optional conventional curing agent can be blended with the thermosetting epoxy resin compound, component (ii), to prepare the curable composition.

Examples of the optional curing agents useful in the present invention may include any of the co-reactive or catalytic curing materials known to be useful for curing epoxy resin based compositions. Such co-reactive curing agents include, for example, polyamine, polyamide, polyaminoamide, Mannich base, phenalkamine, dicyandiamide, polymeric thiol, polycarboxylic acid and anhydride, and any combination thereof or the like. Suitable catalytic curing agents include tertiary amine, quaternary ammonium halide, Lewis acids such as boron trifluoride, and any combination thereof or the like. Other specific examples of co-reactive curing agent include diaminodiphenylsulfone, styrene-maleic acid anhydride (SMA) copolymers; and any combination thereof. Among the conventional co-reactive epoxy curing agents, amines and amino or amido containing resins and phenolics are preferred.

Preferred embodiments of other curing agents blended with the adduct curing agents useful in the present invention may include for example polyamides; polyamines; polymercaptans; Mannich bases; phenalkamines, and mixtures thereof.

Generally, the additional amount of the optional curing agent, in addition to the adduct, used in the curable composition of the present invention will depend on the enduse of the curable composition. For example, as one illustrative embodiment, when the curable composition is used to prepare a weatherable coating, the molar equivalence of epoxy reactive hydrogen in the adduct composition used in the curable composition of the present invention may range generally from about 0.5 to about 1.5 mole equivalents in one embodiment, from about 0.6 to about 1.3 mole equivalents in another embodiment, from about 0.7 to about 1.1 mole equivalents in still another embodiment based on the moles of epoxy of the curable composition.

Other optional compounds or additives known to the skilled artisan can be included in the curable composition particularly any additives specifically intended for a specific enduse application. Such other optional compounds that may be added to the curable composition of the present invention include compounds that are normally used in resin formulations known to those skilled in the art for preparing curable compositions and thermosets. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime Other optional compounds that may be added to the curable composition of the present invention may include, for example, a curing catalyst or accelerator to decrease the curing time of the composition; a solvent to lower the viscosity of the formulation further, other resins such as a phenolic resin that can be blended with the epoxy resin of the formulation; other epoxy resins such as for example, aromatic epoxy resins such as those derived from bisphenol A, bisphenol F, cresol, and phenol; aliphatic glycidyl ethers; cycloaliphatic epoxy resins; and divinylarene dioxides such as divinylbenzene dioxide; pigments, toughening agents, flow modifiers, adhesion promoters, diluents, stabilizers, catalyst de-activators, flame retardants, plasticizers such as for example, benzyl alcohol, salicylic acid, and tris-2,4,6-dimethylaminomethyl phenol; fillers including for example finely divided minerals such as silica, alumina, zirconia, talc, sulfates, $TiO_2$, carbon black, graphite, silicates and the like; other curing agents; other epoxy resins; reinforcing agents; rheology modifiers; surfactants; UV stabilizers; antioxidants; wetting agents; colorants including pigments, dyes, and tints; and mixtures thereof.

Generally, the amount of other optional components, when used in the present invention, may be for example, from 0 wt % to about 80 wt % in one embodiment, from about 0.01 wt % to about 70 wt % in another embodiment; from about 0.1 wt % to about 60 wt % in still another embodiment; and from about 0.1 wt % to about 50 wt % in yet another embodiment.

The process for preparing the curable composition of the present invention includes admixing (i) the above adduct for example the reaction product adduct or the blended adduct of two adducts, (ii) the at least one thermosetting epoxy resin compound, and (iii) optionally, the other optional ingredients as needed. For example, the preparation of the curable resin formulation of the present invention is achieved by mixing, in known mixing equipment, the epoxy compound, the adduct, and optionally any other desirable additives.

In one embodiment, the curable composition can include other desirable additives for example (iii) at least one accelerator compound; (iv) a stabilizer compound or a mixture of the accelerator and stabilizer. Any of the above-mentioned optional additives, for example a curing catalyst, may be added to the composition during the mixing or prior to the mixing to form the curable composition.

All the compounds of the curable formulation are typically mixed and dispersed at a temperature enabling the preparation of an effective curable epoxy resin composition having the desired balance of properties for a particular application. For example, the temperature during the mixing of all components may be generally from about −10° C. to about 40° C. in one embodiment, and from about 0° C. to about 30° C. in another embodiment. Lower mixing temperatures help to minimize reaction of the epoxide and adduct curing agent in the composition to maximize the pot life of the composition.

The preparation of the curable formulation of the present invention, and/or any of the steps thereof, may be a batch or a continuous process. The mixing equipment used in the process may be any vessel and ancillary equipment well known to those skilled in the art.

Curable compositions of the present invention are compatible and display favorable dry through times. "Compatibility" or "compatible" herein is defined in terms of gloss of a cured coating for example wherein the cured coating from a compatible curing composition has an initial gloss of greater than about 80 at about 60°. A favorable dry through time is defined as a dry through time of less than 24 hours as measured on a BYK dry time recorder according to according to ASTM D5895-03 at ambient temperature (25° C.).

In preparing the curable epoxy resin composition of the present invention, the epoxy resin used may be epoxy resins prepared from reaction of aliphatic and cycloaliphatic diols using non-Lewis acid processes such as the epoxy resins described above with reference to preparing the adduct. As aforementioned above, such epoxy resins contain low bound chlorine; and therefore, problems encountered by the prior art epoxy systems can be averted. In addition, an added benefit of epoxy resins prepared from aliphatic and cycloaliphatic diols using non-Lewis acid processes is that these epoxy resins possess low levels of monoglycidyl ether and moderate to high levels of oligomeric product with an average epoxide functionality greater than 2. Due to the presence of low monoglycidyl ether and moderate to high levels of higher functional oligomers, coatings derived from these resins display superior crosslink density properties, and therefore, superior chemical resistance properties.

Therefore, when the above-described epoxy resins are used to prepare the curable resin compositions of the present invention, the resulting curable resin compositions advantageously have low chlorine, low monoglycidyl ether, and an oligomeric component with an average functionality greater than 2.

Thus, the amount of oligomer content in the epoxy resin is preferably 5 wt % to about 25 wt %, more preferably 5 wt % to about 20 wt %, more preferably 10 wt % to about 20 wt %, based on the weight of the epoxy resin. The amount of chlorine in the epoxy resins is preferably 0 wt % to 4 wt %, preferably 0 wt % to 2 wt %, more preferably 0 wt % to 1 wt %, based on the weight of the epoxy resin. The amount of monoglycidyl ether in the epoxy resin is preferably 0 wt % to about 10 wt %, more preferably 0 wt % to about 8 wt %, and most preferably 0 wt % to less than about 5 wt %, based on the weight of the epoxy resin.

Other minor components may be present as a component of the epoxy resin used to prepare the curable resin compositions of the present invention. Generally said minor components may be present in an amount of from about 0 wt % to 5 wt %, more preferably 0 wt % to about 2 wt % and most preferably 0 wt % to less than about 0.5 wt %, based on the weight of the epoxy resin. The epoxy resins prepared from hydroxyl compounds via non-Lewis acid processes display an epoxide equivalent weight (EEW) no more than about 20% higher than the theoretical EEW, preferably less than about 15% higher than the theoretical EEW, and most preferable less than about 10% higher than the theoretical EEW of the chemically pure diglycidyl ether derived from the same hydroxyl compound.

Cycloaliphatic epoxy resins prepared from hydrogenation of aromatic epoxy resins contain low bound chlorine therefore averting the aforementioned problems common to epoxy resins obtained by reacting aliphatic alcohols with epichlorohydrin with Lewis-acid processes. The cycloaliphatic epoxy resins prepared from hydrogenation of aromatic epoxy compounds display an EEW of no more than about 20% higher than the theoretical EEW in one embodiment, less than about 15% higher than the theoretical EEW in another embodiment, and less than about 10% higher than the theoretical EEW in one embodiment, of the chemically pure hydrogenated diglycidyl ether.

The process of the present invention includes curing the curable resin composition to form a thermoset or cured composition. Generally, the process of curing of the curable composition may be carried out at a predetermined temperature for a predetermined period of time sufficient to cure the composition. One of the advantages of the curable composition of the present invention is that the composition is curable at ambient temperature. In one embodiment, the curable resin composition can be advantageously cured at an ambient cure temperature which generally is about 20° C. to about 25° C. However, the curable composition is not limited to being cured at ambient temperature. The curable composition can also be cured at relatively low temperatures ranging from about −10° C. to about 40° C. in one embodiment, and from about 0° C. to about 30° C. in another embodiment.

Generally, the curing time to cure the composition at the above low temperatures may be less than 36 hours in one embodiment, from 1 minute to about 4 weeks in another embodiment, between about 1 hour to about 2 weeks in still another embodiment, and between about 6 hours to about 1 week in yet another embodiment.

In another embodiment, the curable resin composition can be cured by forced cure at a temperature range that includes relatively high temperatures. For example, the temperature of curing the formulation can be generally from about 40° C. to about 200° C. in one embodiment; from about 100° C. to about 190° C. in another embodiment; and from about 125° C. to about 175° C. in still another embodiment.

Generally, the curing time for a forced cure temperature may be chosen between about 1 minute to about 24 hours in one embodiment, between about 5 minutes to about 12 hours in another embodiment, and between about 10 minutes to about 2 hours in still another embodiment.

Both ambient temperature cure and forced cured at higher temperatures provide a final cured product such as a weatherable coating with desired properties.

The curable composition of the present invention may be used to manufacture a cured thermoset weatherable coating product. In particular, for example, the curable composition may be used to prepare a weatherable coating for maintenance and protective coating (M&PC) applications. Other enduse applications may include formulations for inks and coatings, composite, and laminate applications.

The cured product (i.e. the cross-linked product made from the curable composition) of the present invention when used as a weatherable coating shows several improved properties over conventional epoxy cured resins used for coatings. For example, the coating of the present invention may advantageously have an initial gloss of greater than 80 at a measurement angle of 60°. In addition, the coating can have a gloss retention upon accelerated weathering according to ASTM D4587-11 after 500 hours from about 30% to 100% in one embodiment, from about 50% to 100% in another embodiment, and from about 70% to 100% in yet another embodiment.

EXAMPLES

The following examples and comparative examples further illustrate the present invention in detail but are not to be construed to limit the scope thereof.

Various terms and designations used in the following examples are explained herein below:

"BPEA" stands for bis(2-(piperazin-1-yl)ethyl amine.

"CHDM" stands for 1,4-cyclohexanedimethanol.

"CHDM DGE" stands for 1,4-cyclohexanedimethanol epoxy resin.

"Unoxol™ DGE" is resin mixture of an epoxy of 1,3/1,4 cyclohexanedimethanol.

"H-BADGE" stands for hydrogenated bisphenol A diglycidyl ether.

"AEP" stands for aminoethyl piperazine.

"IPDA" stands for isophorone diamine. IPDA was obtained from Sigma-Aldrich.

"DETA" stands for diethylene triamine.

"TETA" stands for triethylene tetraamine.

"DGS-140" stands for a polyamide epoxy curing agent commercially available from The Dow Chemical Company.

"MXDA" stands for meta xylene diamine.

"1,3-BAC" stands for 1,3-bis-aminomethylcyclohexane.

"AHEW" stands for amine hydrogen equivalent weight.

"EEW" stands for epoxide equivalent weight.

D.E.R. 331 is an aromatic epoxy resin epoxy resin having an EEW of 190 and commercially available from The Dow Chemical Company.

Different distillation streams of CHDM epoxy resin, Unoxol™ epoxy resin, or H-LER with equivalent weight ranges from 128 to 220 were prepared. UV stabilizers including Tinuvin 123 and Tinuvin 400 were obtained from BASF.

Benzyl alcohol, salicylic acid and DMP-30 were obtained from Sigma-Aldrich.

Examples 1-4 and Comparative Examples A-N

Adduct Synthesis

As shown in Table 1, a number of epoxy-amine adducts were prepared following an analogous procedure to the procedure described below for Example 4.

The mixed amine adduct of IPDA and BPEA was synthesized from 40 g of IPDA, 40 g of BPEA (amine hydrogen is 10 molar times of epoxide) and 20.4 g of CHDM epoxy resin (EEW 142). The reactants were charged into a three-neck round bottomed flask equipped with a mechanical stirrer, an internal temperature probe, and a reflux cold water condenser. A nitrogen blanket was introduced into the reactor and cooling water for the condenser was turned on for the reactor. The stirrer (the mixer) was set at about 250 revolutions per minute (rpm) to 300 rpm and the two ingredients were mixed well.

The flask was lowered into a pre-heated 50° C. hot oil bath while monitoring the internal temperature. The temperature of the oil bath was increased by 10° every 20 minutes until the oil bath temperature reached 100° C. where said temperature was held for 20 minutes. Then, the reaction was cooled and the product collected.

TABLE 1

Adducts Prepared and Theoretical AHEWs

| Example | Adduct Hardener | Moles Amine NH: mole epoxy | Theoretical AHEW |
|---|---|---|---|
| Comparative Example A | BPEA: CHDM Epoxy Resin | 15 | 96 |
| Comparative Example B | BPEA: CHDM Epoxy Resin | 8 | 112 |
| Comparative Example C | BPEA: CHDM Epoxy Resin | 4 | 155 |
| Comparative Example D | AEP: CHDM Epoxy Resin | 8 | 69 |
| Comparative Example E | IPDA: CHDM Epoxy Resin | 12 | 59 |
| Comparative Example F | IPDA: CHDM Epoxy Resin | 8 | 69 |
| Comparative Example G | 1,3 BAC: CHDM Epoxy Resin | 8 | 61 |
| Comparative Example H | DGS 140: CHDM Epoxy Resin | 12 | 117 |
| Comparative Example I | IPDA: H-BADGE | 10 | 70 |
| Comparative Example J | BPEA: H-BADGE | 10 | 112 |
| Comparative Example K | 1,3 BAC: H-BADGE | 10 | 62 |
| Example 1 | 1,3 BAC/BPEA (1/1)[a]: CHDM Epoxy Resin | 10 | 77 |
| Example 2 | 1,3 BAC/IPDA (1/1): CHDM Epoxy Resin | 10 | 59 |
| Example 3 | 1,3 BAC/DGS 140 (3/7): CHDM Epoxy Resin | 10 | 86 |
| Comparative Example L | MXDA: CHDM Epoxy Resin | 10 | 54 |
| Comparative Example M | IPDA: CHDM Epoxy Resin | 10 | 63 |
| Example 4 | BPEA/IPDA (1/1): CHDM Epoxy Resin | 10 | 78 |
| Comparative Example N | PACM: CHDM Epoxy Resin | 10 | 75 |

[a]Weight ratio of amines to each other

Examples 5-11, 17 and Comparative Examples O-P

Curable Composition Preparation and Dry Times

Coating formulations as described in Table 2 were prepared by mixing a curing agent(s) with a formulated CHDM epoxy resin at a 1:1 NH: epoxy stoichiometric ratio. In cases where blends of curing agents were utilized each comprised 50 wt % of the total amount of curing agent unless indicated otherwise. Pigmented CHDM epoxy resin is a formulation consisting of 50.94% CHDM epoxy resin (EEW 142), 0.76 wt % Benton SD2, 14 wt % Ti-Pure R706, 26.7 wt % Imsil 1240, and 7.6 wt % Cimbar UF with an overall EEW for the formulation of 279. The coatings were drawn down onto glass substrates with a wet film thickness of 76 μm and drying evaluated on a BYK drying time recorder. The set-to-touch, tack-free, and dry-through times were measured by dragging a needle through the coating using a BYK drying time recorder according to ASTM D5895-03 at ambient temperature (25° C.).

Table 2 shows the dry through times of the adducts of the present invention are faster than those adducts of the comparative examples.

TABLE 2

Dry Times of Curable Compositions

| Example | Curing Agent 1 | Curing Agent 2 | Set to Touch (hr) | Tack Free (hr) | Dry Through (hr) |
|---|---|---|---|---|---|
| Example 5 | Example 1 | na[(1)] | 7.2 | 9.2 | 14.7 |
| Example 6 | Comparative Example G | Comparative Example B | 4.5 | 5.5 | 11.2 |
| Example 7 | Example 2 | na | 3.6 | 4.5 | 5.9 |
| Example 8 | Comparative Example G | Comparative Example M | 4.0 | 5.0 | 7.5 |
| Example 9 | Example 3 | na | 5.7 | 6.1 | 7.4 |
| Example 10 | Comparative Example G | Comparative Example H | 6.3 | 6.7 | 9.4 |

TABLE 2-continued

Dry Times of Curable Compositions

| Example | Curing Agent 1 | Curing Agent 2 | Set to Touch (hr) | Tack Free (hr) | Dry Through (hr) |
|---|---|---|---|---|---|
| Comparative Example O | Comparative Example H | na | 9.9 | 10.7 | >24 |
| Comparative Example P | Comparative Example M | na | 6.7 | 9.9 | 22.6 |
| Example 11 | Comparative Example G, 30 wt % | Comparative Example H 70 wt % | 8.1 | 8.9 | 15.3 |
| Example 17 | Comparative Example M | Comparative Example D | 8.5 | 12.4 | 21.2 |

[(1)]na = not applicable

Examples 13 and 14 and Comparative Example Q-R

Coating Gloss Retention

Coating formulations for Examples 13 and 14, and Comparative Examples Q-R, as described in Table 3, were prepared by mixing the curing agent adduct with pigmented CHDM epoxy resin at a 1:1 epoxy:NH stoichiometric ratio.

TABLE 3

Coating Formulations

| Example | Curing Agent | Curing Agent 2 |
|---|---|---|
| Example 12 | Example 4 | na |
| Example 13 | Comparative Example E | Comparative Example B |
| Example 14 | Comparative Example E | Comparative Example N |
| Comparative Example Q | Comparative Example E | na |
| Comparative Example R | Comparative Example N | na |

TABLE 3-continued

Coating Formulations

| Example | Curing Agent | Curing Agent 2 |
|---|---|---|
| Example 15 | Comparative Example E | Comparative Example D |
| Example 16 | Comparative Example E | Comparative Example D |
| Comparative Example S | Comparative Example E | na |

For Examples 13 and 14, a 50/50 weight/weight blend of the two indicated curing agents was used. Pigmented CHDM epoxy is a formulation consisting of 50.94 wt % CHDM epoxy resin (EEW 142), 0.76 wt % Bentone SD2, 14 wt % Ti-Pure R706, 26.7 wt % Imsil 1240, and 7.6 wt % Cimbar UF with an overall EEW of the formulation of 279. The coating formulations were then applied to metal panels according to ASTM D4147-99(2007). Each of the coating formulations was poured across the top end of the panel and a #50 wire size (0.050" wire diameter) wire wound drawdown bar was placed behind the mixture. The bar was then drawn with uniform pressure and speed along the length of the panel toward the operator to generate a uniform film. After coating the panels and forming a film thereon, the panels were cured at ambient temperature (about 25° C.) and humidity (about 60%) for 7 days. The panels were then subjected to accelerated weathering by cycling UV A light and condensing humidity on a 4 hour cycle according to ASTM D4587-11, for industrial maintenance coatings.

Figure 1:
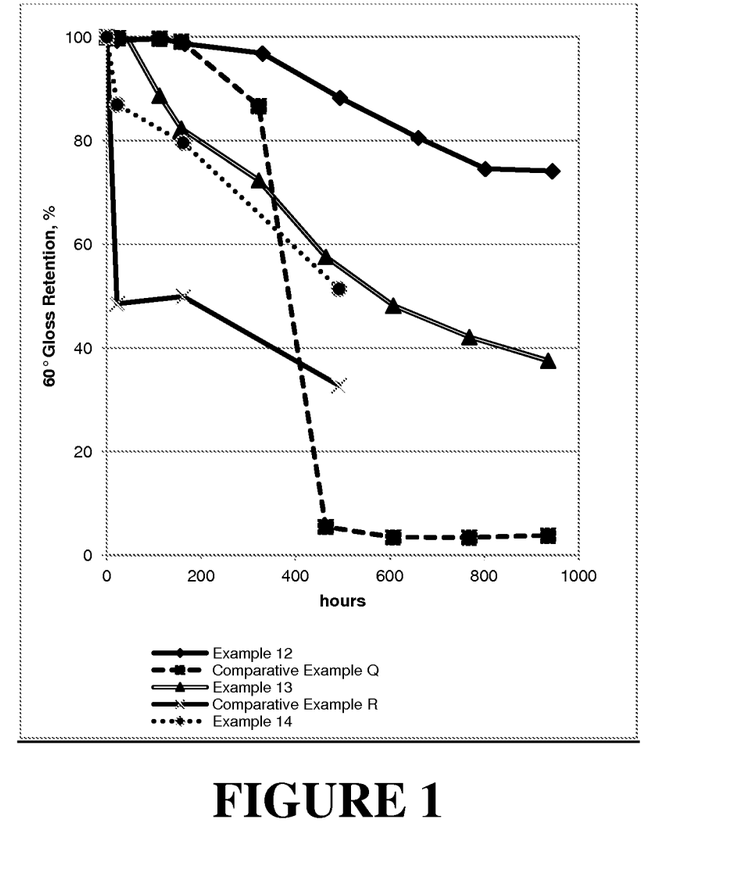
FIG. 1 is a graphical illustration showing the superior gloss retention of inventive coatings versus comparative examples.

As shown in FIG. 1, the superior gloss retention of a coatings prepared from formulations containing the adducts of the present invention provide a greater gloss retention relative to that of a coating prepared from a formulation from comparative adducts.

Examples 15 and 16 and Comparative Example S

Coating Gloss Retention

For Example 15, a 50/50 weight/weight blend of the two indicated curing agents was used. For Example 16, a 75/25 weight/weight blend of the two indicated curing agents was used. Pigmented CHDM epoxy is a formulation consisting of 55.32 wt % CHDM epoxy resin (EEW 149), 1.56 wt % Bentone SD2, 82.94 wt % Ti-Pure R960, 0.10 wt % BYK066N with an overall EEW of the formulation of 249. The coating formulations were then applied to metal panels according to ASTM D4147-99(2007). Each of the coating formulations was poured across the top end of the panel and a #50 wire size (0.050" wire diameter) wire wound drawdown bar was placed behind the mixture. The bar was then drawn with uniform pressure and speed along the length of the panel toward the operator to generate a uniform film. After coating the panels and forming a film thereon, the panels were cured at ambient temperature (about 25° C.) and humidity (about 10%) for 7 days. The panels were then subjected to accelerated weathering by cycling UV A light and condensing humidity on a 4 hour cycle according to ASTM D4587-11, for industrial maintenance coatings.

Figure 2:
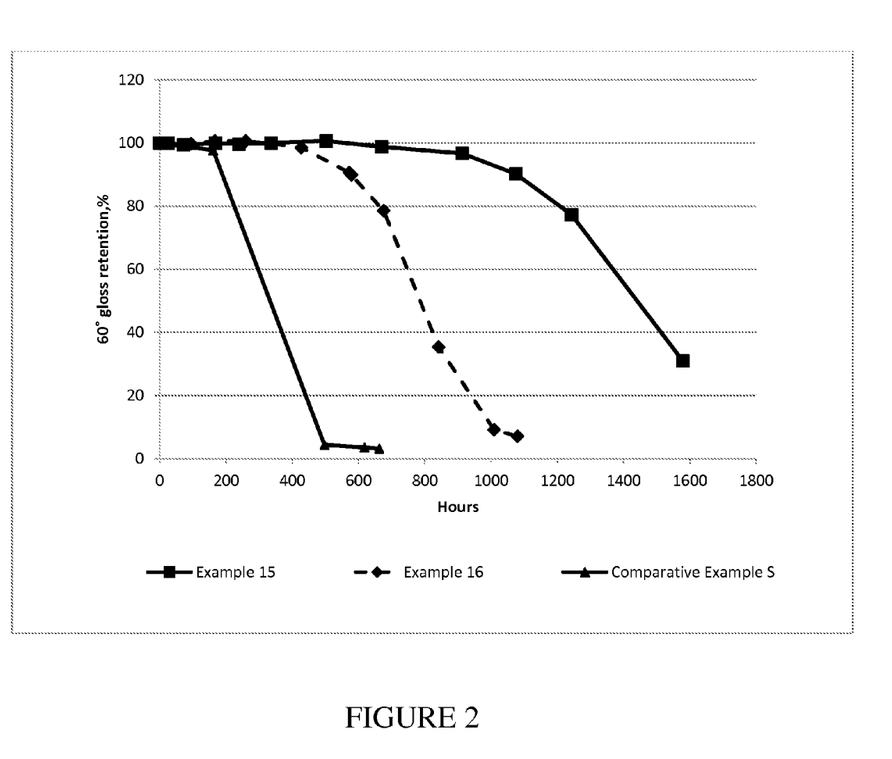
FIG. 2 is a graphical illistration showing the superior gloss retention of inventive coatings versus comparative examples.

As shown in FIG. 2, the superior gloss retention of a coatings prepared from formulations containing a 50:50 weight blend of the adducts of the present invention provide a greater gloss retention relative to that of a coating prepared from a formulation from comparative adducts.

The invention claimed is:

1. An adduct comprising a reaction product of
   (a) at least a first cycloaliphatic amine compound;
   (b) at least a second cycloaliphatic amine compound; and
   (c) at least one cycloaliphatic epoxy resin compound;
   wherein the first and second cycloaliphatic amine compounds comprise bis(2-(piperazin-1-yl)ethyl amine; aminoethyl piperazine; isophorone diamine; bis-aminomethylcyclohexane; bis(aminocyclohexyl)methane; or mixtures thereof; provided that the first and second cycloaliphatic amine compounds are not the same compound.

2. The adduct of claim 1, wherein the at least one cycloaliphatic epoxy resin compound comprises cyclohexanedimethanol epoxy resin; hydrogenated bisphenol A epoxy resin; or mixtures thereof.

3. The adduct of claim 1, wherein the at least one cycloaliphatic epoxy resin compound comprises 1,4-cyclohexanedimethanol epoxy resin.

4. The adduct of claim 1, wherein the at least one cycloaliphatic epoxy resin compound comprises a mixture of 1,3-cyclohexanedimethanol epoxy resin and 1,4-cyclohexanedimethanol epoxy resin.

5. The adduct of claim 1, wherein the first and second cycloaliphatic amine compounds independently have between 2 and 6 amine nitrogen atoms per molecule.

6. The adduct of claim 1, wherein the first cycloaliphatic amine compound comprises isophorone diamine.

7. The adduct of claim 1, wherein the second cycloaliphatic amine compound comprises bis(2-(piperazin-1-yl) ethyl amine, bis(aminocyclohexyl)methane, bis-aminomethylcyclohexane, or mixtures thereof.

8. The adduct of claim 1, wherein the molar ratio of the sum of active hydrogen (N—H) of the first and second cycloaliphatic amine compound to the epoxy functionality of the at least one epoxy resin compound is from about 2 to about 20.

9. A process for preparing a curable composition comprising admixing
   (A) the adduct of claim 1; wherein the at least one cycloaliphatic epoxy resin compound comprises 1,4-cyclohexanedimethanol epoxy resin; hydrogenated bisphenol A epoxy resin; or mixtures thereof; and (B) at least one thermosetting epoxy resin compound; said curable composition being curable at ambient temperature.

10. The process of claim 9, wherein (C) at least one accelerator compound is admixed with compounds (A) and (B).

11. An adduct comprising a blend of
   (I) at least a first adduct comprising:
      (a) at least a first cycloaliphatic amine compound; and
      (b) at least one cycloaliphatic epoxy resin compound; and
   (II) at least a second adduct comprising:
      (a) at least a second cycloaliphatic amine compound; and
      (b) at least one cycloaliphatic epoxy resin compound;
   wherein the first and second cycloaliphatic amine compounds comprise bis(2-(piperazin-1-yl)ethyl amine; aminoethyl piperazine; isophorone diamine; bis-aminomethylcyclohexane; bis(aminocyclohexyl)methane; or mixtures thereof; provided that the first and second cycloaliphatic amine compounds are not the same compound.

12. A process for preparing a curable composition comprising admixing
   (A) the adduct of claim 11; wherein the at least one cycloaliphatic epoxy resin compound comprises 1,4- cyclohexanedimethanol epoxy resin; hydrogenated bisphenol A epoxy resin; or mixtures thereof; and (B) at least one thermosetting epoxy resin compound; said curable composition being curable at ambient temperature.

13. A process for preparing an adduct comprising reacting (a) at least a first cycloaliphatic amine compound; (b) at least a second cycloaliphatic amine compound; and (c) at least one cycloaliphatic epoxy resin compound
   wherein the first and second cycloaliphatic amine compounds comprise bis(2-(piperazin-1-yl)ethyl amine; aminoethyl piperazine; isophorone diamine; bis-aminomethylcyclohexane; bis(aminocyclohexyl)methane; or mixtures thereof; provided that the first and second cycloaliphatic amine compounds are not the same compound.

14. A process for preparing an adduct comprising blending:
   (I) at least a first adduct comprising the reaction product of:
   (a) at least a first cycloaliphatic amine compound; and
   (b) at least one cycloaliphatic epoxy resin compound; and
   (II) at least a second adduct comprising the reaction product of:
   (a) at least a second cycloaliphatic amine compound; and
   (b) at least one cycloaliphatic epoxy resin compound
   wherein the first and second cycloaliphatic amine compounds comprise bis(2-(piperazin-1-yl)ethyl amine; aminoethyl piperazine; isophorone diamine; bis-am inomethylcyclohexane; bis(aminocyclohexyl)methane; or mixtures thereof; provided that the first and second cycloaliphatic amine compounds are not the same compound.

15. A curable epoxy resin composition comprising
   (i) an adduct comprising a reaction product of
   (a) at least a first cycloaliphatic amine compound;
   (b) at least a second cycloaliphatic amine compound; and
   (c) at least one cycloaliphatic epoxy resin compound; and
   (ii) at least one thermosetting epoxy resin compound
   wherein the first and second cycloaliphatic amine compounds comprise bis(2-(piperazin-1-yl)ethyl amine; am inoethyl piperazine; isophorone diamine; bis-am inomethylcyclohexane; bis(aminocyclohexyl)methane; or mixtures thereof; provided that the first and second cycloaliphatic amine compounds are not the same compound.

16. The curable epoxy resin composition of claim 15, wherein the at least one cycloaliphatic epoxy resin compound or comprises cyclohexanedimethanol epoxy resin; hydrogenated bisphenol A epoxy resin; or mixtures thereof.

17. The curable epoxy resin composition of claim 15, wherein the molar ratio of active hydrogen (N-H) in the at least one adduct to the epoxy functionality in the at least one thermosetting epoxy resin compound is from about 0.5 to about 1.5.

18. The curable epoxy resin composition of claim 15, wherein either the first or second cycloaliphatic amine compound comprises bis(2-(piperazin-l-yl)ethyl amine.

19. The curable epoxy resin composition of claim 15, wherein the at least one thermosetting epoxy resin compound comprises 1,4-cyclohexanedimethanol epoxy resin.

20. The curable epoxy resin composition of claim 15, including at least one of a cure catalyst; a second epoxide compound separate and different from the at least one thermosetting epoxy resin compound, a filler, a reactive diluent, a flexibilizing agent, a processing aide, a toughening agent, or a mixture thereof.

21. A process for preparing thermoset comprising:
   (I) providing a curable composition of:
   (i) an adduct of (a) at least one cycloaliphatic amine compound, and (b) at least one epoxy resin compound; wherein the at least one epoxy resin compound comprises 1,4-cyclohexanedimethanol epoxy resin; hydrogenated bisphenol A epoxy resin; or mixtures thereof; and (ii) at least one thermosetting epoxy resin compound; said curable composition being curable at ambient temperature; and
   (II) curing the curable composition of step (I);
   wherein the at least one cycloaliphatic amine compound comprises bis(2-(piperazin-1-yl)ethyl amine; aminoethvl piperazine; isophorone diamine; bis-aminomethylcyclohexane; bis(aminocyclohexyl)methane; or mixtures thereof.

22. The process of claim 21, wherein (iii) at least one accelerator compound is admixed with compounds (i) and (ii) in step (I).

23. A cured thermoset article prepared by the process of claim 21.

24. The cured thermoset article of claim 23 comprising a weatherable coating.

* * * * *

UNITED STATES PATENT AND TRADEMARK OFFICE
CERTIFICATE OF CORRECTION

PATENT NO. : 9,567,480 B2
APPLICATION NO. : 14/423503
DATED : February 14, 2017
INVENTOR(S) : Erin B. Vogel et al.

Page 1 of 1

It is certified that error appears in the above-identified patent and that said Letters Patent is hereby corrected as shown below:

In the Claims

In Claim 14, at Column 19, Lines 29-30: "bis-am inom-ethylcyclohexane" should be changed to -- bis-aminomethylcyclohexane --.

In Claim 15, at Column 19, Lines 42-43: "bis-am inom-ethylcyclohexane" should be changed to -- bis-aminomethylcyclohexane --.

Signed and Sealed this
Fifth Day of September, 2017

Joseph Matal
*Performing the Functions and Duties of the
Under Secretary of Commerce for Intellectual Property and
Director of the United States Patent and Trademark Office*